Oct. 4, 1927.
F. P. JONES
1,644,434
ADJUSTABLE BEAM HANGER
Filed Dec. 11, 1926
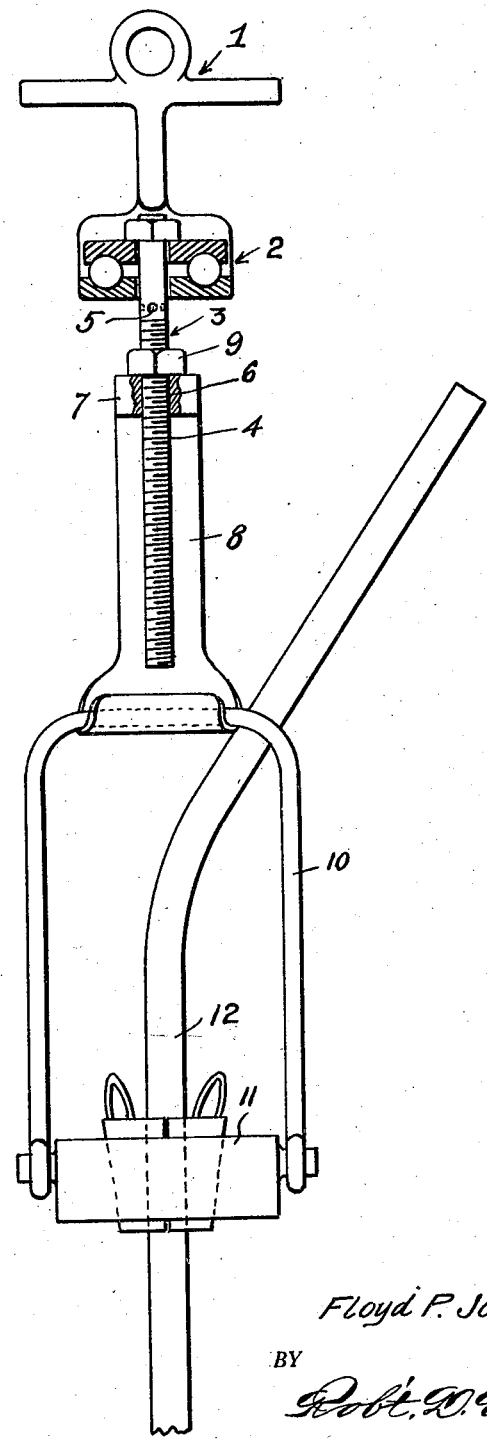
INVENTOR.
Floyd P. Jones
BY
Robt. D. Pearson
ATTORNEY.

Patented Oct. 4, 1927.

1,644,434

UNITED STATES PATENT OFFICE.

FLOYD P. JONES, OF TORRANCE, CALIFORNIA.

ADJUSTABLE BEAM HANGER.

Application filed December 11, 1926. Serial No. 154,185.

This invention relates to beam hanger mechanism adapted to be used in oil well construction and attached to the walking beam, operated by the engine and in turn connected with the polish rod depending into the well for the purpose of conveniently and readily adjusting the lower end of the polish rod in a vertical direction with reference to the bottom of the well.

The invention consists in the novel and simple combination of elements and arrangement of parts for accomplishing this purpose.

In carrying out my invention, and referring to the accompanying drawing, a cross-head member 1 is provided which is adapted to be pivoted to the walking beam (not shown) operated by an engine or other motive power. The cross-head 1 has formed on its lower end a swivel ball thrust bearing 2 which may be of any approved construction. Swivelly connected to the bearing 2 is a downwardly depending rod 3 which is externally threaded as at 4, and has formed in it the notches or drills 5 in which a rod or bar may be inserted for the purpose of rotating said rod.

The rod 3 is threaded into the threaded aperture 6 of a lug 7 formed at the top end of the clevis hook 8 and has threaded on to it a jamb nut 9 adapted to engage with the upper surface of the lug 7 for the purpose of locking the rod and clevis hook together in adjusted relation.

Depending from and engaging with the clevis hook is the clevis 10 and swiveled to the clevis is a clutch member 11, of any desired construction, adapted to clutch the polish rod which is designated by the numeral 12.

By the above recited construction, it will be obvious that the polish rod 11 may be approximately adjusted with respect to the well bottom and then further and a more minute adjustment of this element may be made by manipulating the rod 3, as for instance, by either turning it to the right or left in the threaded bore 6 of the lug 7, the jamb nut 9 being previously loosened.

Having thus described my invention what I claim is:

1. In a beam hanger, a cross-head having a swivel thrust bearing formed on its lower end; a clevis hook provided with a threaded bore; a threaded rod engaging with the bore in said clevis hook and said thrust bearing; a clevis depending from said clevis hook; and a clutch member attached to the lower end of said clevis.

2. In a beam hanger, a cross head having formed on its lower end a swivel thrust bearing; a rod having its upper end attached to said thrust bearing and having its lower end threaded; a clevis hook provided with a threaded bore at its upper end into which said rod is threaded and a hook on its lower end; and a clevis depending from said hook having a clutch member swiveled to its lower end.

In testimony whereof I hereunto affix my signature.

FLOYD P. JONES.